United States Patent
Gill

(10) Patent No.: US 6,538,856 B1
(45) Date of Patent: Mar. 25, 2003

(54) READ HEAD WITH SPIN VALVE SENSOR HAVING SENSE CURRENT IN PLANE (CIP) THENCE SENSE CURRENT PERPENDICULAR TO PLANE (CPP)

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 09/599,054

(22) Filed: Jun. 21, 2000

(51) Int. Cl.⁷ .............................................. G11B 5/127
(52) U.S. Cl. ...................... 360/319; 360/322
(58) Field of Search .................. 360/317, 319, 360/324.1, 322, 324.12, 324.2

(56) References Cited

U.S. PATENT DOCUMENTS

| | | | |
|---|---|---|---|
| 5,216,560 A | 6/1993 | Brug et al. .................. | 360/113 |
| 5,390,061 A | 2/1995 | Nakatani et al. ............ | 360/113 |
| 5,527,626 A | 6/1996 | Gijs et al. .................... | 428/611 |
| 5,712,612 A | 1/1998 | Lee et al. ...................... | 338/32 |
| 5,905,611 A | 5/1999 | Yoda et al. .................. | 360/113 |
| 6,198,609 B1 * | 3/2001 | Barr et al. .................. | 360/319 |
| 6,219,205 B1 * | 4/2001 | Yuan et al. .................. | 360/319 |
| 6,286,200 B1 * | 9/2001 | Huang et al. ............ | 29/603.08 |
| 6,327,122 B1 * | 12/2001 | Pinarbasi ............... | 360/324.11 |

FOREIGN PATENT DOCUMENTS

| | | |
|---|---|---|
| JP | 408329426 A | 12/1996 |
| JP | 4091080133 A | 7/1997 |

OTHER PUBLICATIONS

M. A. Gijs et al, "Perpendicular giant magnetoresistance of Co/Cu multilayers deposited under and angle on grooved substrates", 1995, *Appl. Phys.* letter, 66(14), pp 1839ff.

D. Wang et al, "Spin dependent tunnel/spin–valve devices with different pinning structures made by photolithography". 1999, *J. Appl. Phys.*, 85(8), pp 5255ff.

P.M. Levy et al, "Electrical transport in corrugated multi-layered structures", 1995, *Physical Review B*, 52(22), pp 16049ff.

* cited by examiner

*Primary Examiner*—William Korzuch
*Assistant Examiner*—Jennifer M Dolan
(74) *Attorney, Agent, or Firm*—Ervin F. Johnston

(57) ABSTRACT

A first lead is connected to an edge of a free layer of a spin valve sensor for conducting a sense current parallel to the planes of its film surfaces after which the sense current is conducted perpendicular to the planes of the film surfaces of the remainder of the layers of the spin valve sensor to a second lead layer which may be a first shield layer of the read head. The conduction of the sense current parallel to the film surfaces of the free layer provides the spin valve sensor with sufficient resistance so as to enable processing circuitry to efficiently produce playback signals.

57 Claims, 7 Drawing Sheets

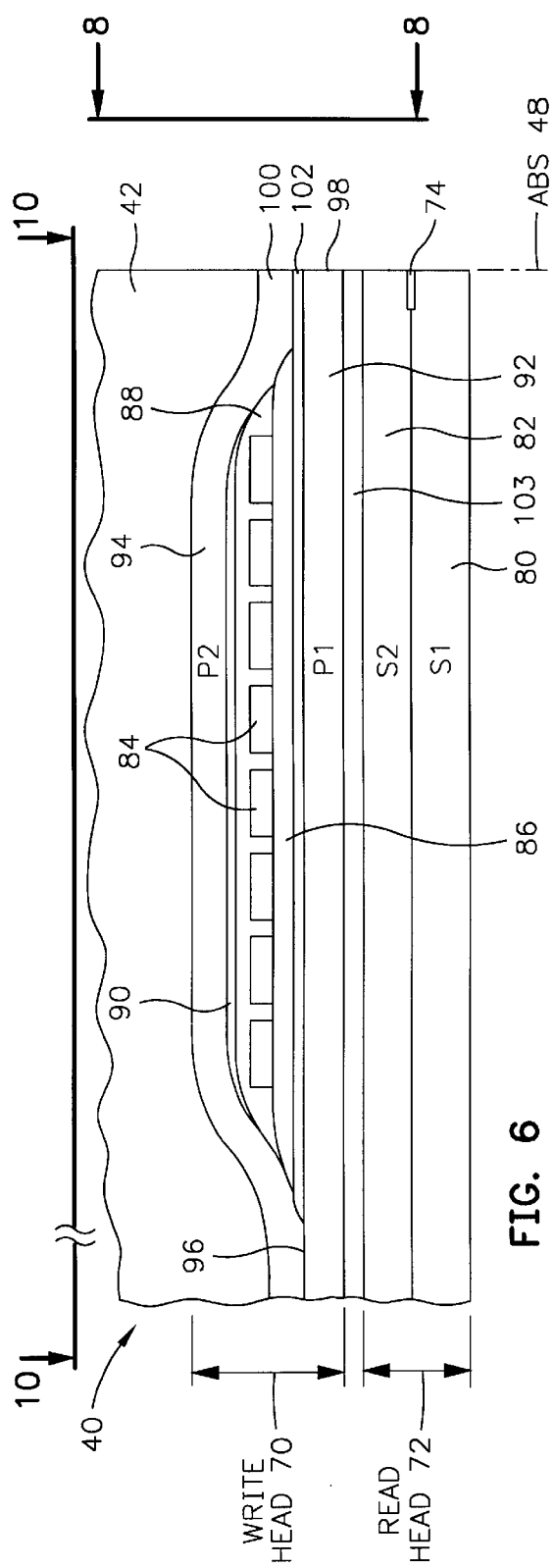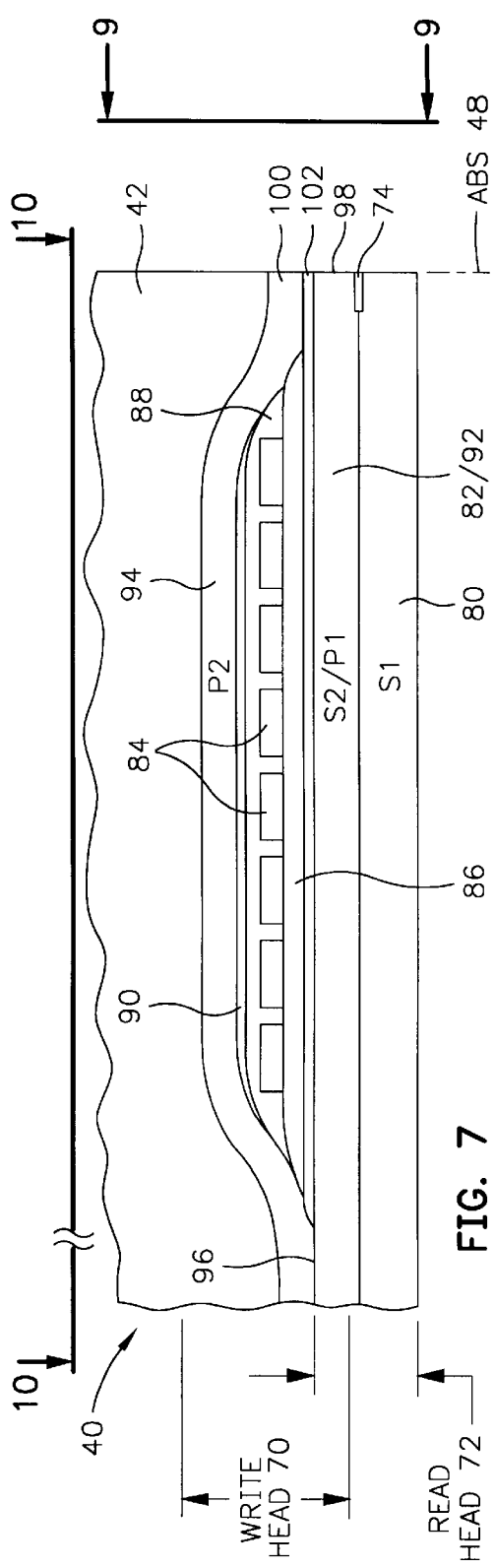

READ HEAD WITH SPIN VALVE SENSOR HAVING SENSE CURRENT IN PLANE (CIP) THENCE SENSE CURRENT PERPENDICULAR TO PLANE (CPP)

BACKGROUND OF THE INVENTION

1. Field of the Invention

The present invention relates to a read head with a spin valve sensor that has a sense current employing sense current in plane (CIP) thence the sense current perpendicular to the plane (CPP) and, more particularly, to a first lead which is connected to an edge of the free layer of the spin valve sensor for conducting the sense current in plane in the free layer and a second lead layer, which may be a shield layer, which interfaces the film surface of the spin valve sensor for conducting the sense current perpendicular to the layers of the spin valve sensor, except for the free layer.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk. If the quiescent position of the magnetic moment is not parallel to the ABS the positive and negative responses of the free layer will not be equal which results in read signal asymmetry which is discussed in more detail hereinbelow.

When the magnetic moments of the pinned and free layers are parallel with respect to one another the resistance of the sensor is at a minimum and when their magnetic moments are antiparallel the resistance of the sensor is at a maximum. Changes in resistance of the spin valve sensor is a function of $\cos \theta$, where $\theta$ is the angle between the magnetic moments of the pinned and free layers. When the sense current ($I_S$) is conducted through the spin valve sensor, resistance changes detected by the sensor from the rotating magnetic disk cause potential changes that are detected and processed as playback signals. The sensitivity of the spin valve sensor is quantified as magneto-resistive coefficient dr/R where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. Because of the high magneto-resistance of a spin valve sensor it is sometimes referred to as a giant magnetoresistive (GMR) sensor.

The transfer curve for a spin valve sensor is defined by the aforementioned $\cos \theta$ where $\theta$ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields that are equal from the magnetic disk. Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. The designer strives to improve asymmetry of the readback signals as much as practical with the goal being symmetry. When the readback signals are asymmetrical, signal output and dynamic range of the sensor are reduced.

The location of the transfer curve relative to the bias point is influenced by three major forces on the free layer of a spin valve sensor, namely a ferromagnetic coupling field $H_{FC}$ between the pinned layer and the free layer, a net demag field $H_D$ from the pinned layer and a sense current field $H_I$ from all conductive layers of the spin valve except the free layer. The strongest magnetic force on the free layer structure is the sense current field $H_I$.

The problem of the sense current field on the free layer caused by conduction of the sense current $I_S$ through the other layers of the spin valve sensor can be overcome by conducting the sense current perpendicular to the film surfaces of the spin valve sensor (CPP) in contrast to conducting the sense current parallel to the film surfaces of the spin valve sensor (CIP). With this arrangement the first and second read gap layers may be eliminated with a bottom film of the spin valve sensor being electrically connected to the first shield layer and a top film of the spin valve sensor being electrically connected to the second shield layer. The first and second shield layers can serve the purpose of first and second lead layers for conducting the sense current perpendicular to the film surface planes of the spin valve sensor. In addition to eliminating the sense current fields on the free layer this arrangement has other advantages, namely: (1) a higher magnetoresistive coefficient dr/R than a typical spin valve sensor; (2) no shunting of the sense current past the free layer, which shunting results in the loss of the magnetoresistive coefficient dr/R; and (3) the thicknesses of the spacer and film layer structures becomes less critical which enables their thicknesses to be designed to counterbalance the aforementioned demagnetizing field and ferromagnetic coupling field on the free layer structure. A major problem with the sense current being conducted perpendicular to the film surface planes (CPP) of the spin valve sensor is that the spin valve sensor has insufficient resistance to the sense current to support the processing circuitry for detecting resistance changes to provide adequate playback signals. Accordingly, there is a strong-felt need to provide the CPP spin valve sensor with sufficient resistance so that the playback signals will be operable.

SUMMARY OF THE INVENTION

The present invention overcomes aforementioned problem of insufficient resistance of the spin valve sensor by conducting the sense current through the free layer structure parallel to its film surfaces thence perpendicular to the film surfaces of the other layers of the spin valve sensor. Each of the pinned layer structure, the pinning layer, the spacer layer, the free layer structure and the first and second shield layers have top and bottom film surfaces which are bounded by front and back edges and first and second side edges with the front edges being closer to the ABS than the back edges. First and second insulation layers are located between the first and second shield layers. The first lead layer is located between the first and second insulation layers and has top and bottom film surfaces which are bounded, in part, a front edge and first and second side edges. The front edge of the first lead layer abuts the back edge of the free layer structure for electrical connection thereto. One of the first and second shield layers serves as a second lead layer and has one of its first and second film surfaces electrically connected to one of the first and second film surfaces of the pinning layer.

In a preferred embodiment the pinned layer structure is an antiparallel (AP) pinned layer structure, which includes an antiparallel coupling layer located between first and second antiparallel (AP) layers. The antiparallel coupling layer is typically ruthenium (Ru) and is sufficiently thin so that the magnetic moments of the first and second AP pinned layers are antiparallel with respect to one another. With this arrangement the antiparallel pinned layer exerts a very low net demagnetizing field on the free layer structure. By appropriately sizing the thicknesses of the AP pinned layers and the spacer layer the ferromagnetic coupling field exerted on the free layer structure by the second AP pinned layer can be made to counterbalance the demagnetizing field from the AP pinned layer structure. Since there will be no sense current field exerted on the free layer structure biasing of the free layer structure for readback symmetry is more easily achieved.

In a preferred embodiment of the invention the first lead layer and the free layer structure are located closer to one of the shield layers so that a net image sense current field is exerted on the free layer structure parallel to its film surfaces and parallel to the ABS for stabilizing the magnetic domains of the free layer structure. It should be understood that in each of the shield layers there is an image current which is parallel to the sense current and is caused thereby. Therefore, in each shield layer there is an image current field which is caused by the image current in each shield layer. When the free layer is symmetrically placed between the first and second shield layers these image current fields completely counterbalance one another. In the present invention, by asymmetrically locating the free layer structure, the aforementioned image current field can be employed for magnetically stabilizing the free layer.

An object of the present invention is to provide a spin valve sensor wherein the sense current is conducted in such a manner through the spin valve sensor that the magnetoresistive coefficient dr/R is significantly increased over that of a spin valve sensor where the sense current is conducted parallel to the film surfaces of the spin valve sensor.

Another object is to provide a single spin valve sensor wherein the free layer is not subjected to a sense current field.

A further object is to provide the read head with a spin valve sensor wherein a sense current is conducted both perpendicular to and parallel to the film surfaces of the spin valve sensor with the free layer not being subjected to a sense current field but subjected to a net image current field for stabilizing its magnetic domains.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
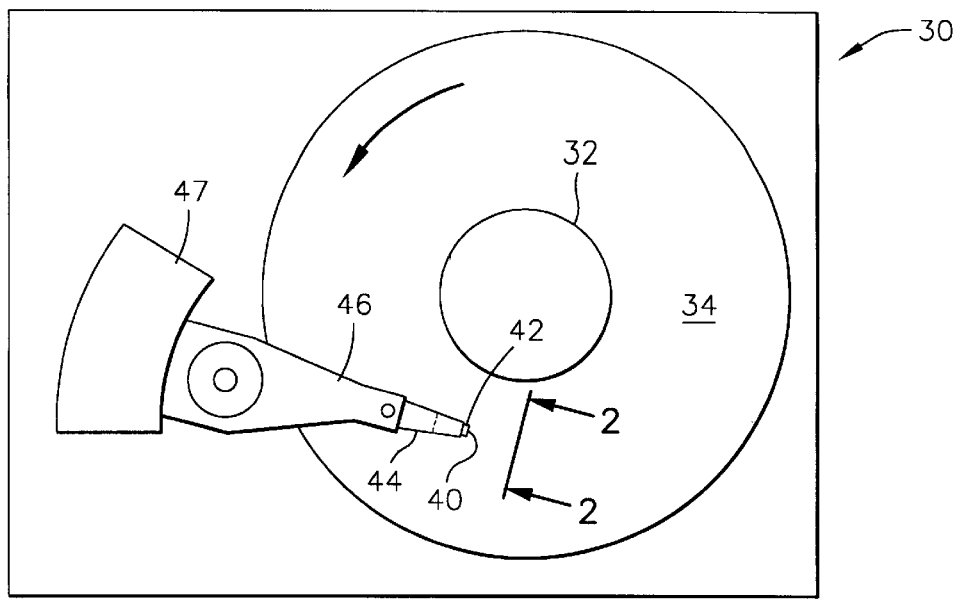
FIG. 1 is a plan view of an exemplary magnetic disk drive.
Figure 2:
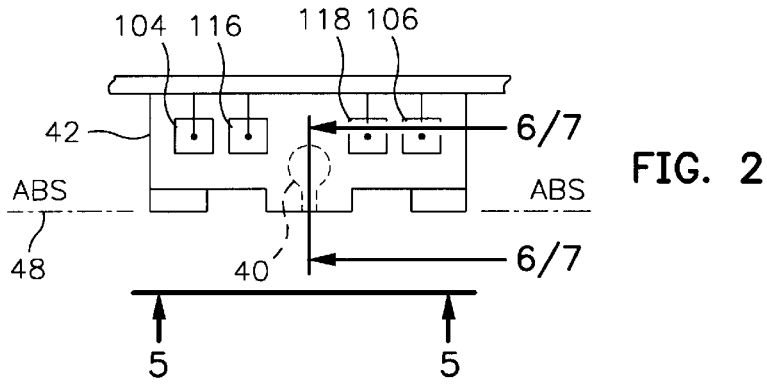
FIG. 2 is an end view of a slider with a magnetic head of the disk drive as seen in plane 2—2 of FIG. 1.
Figure 3:
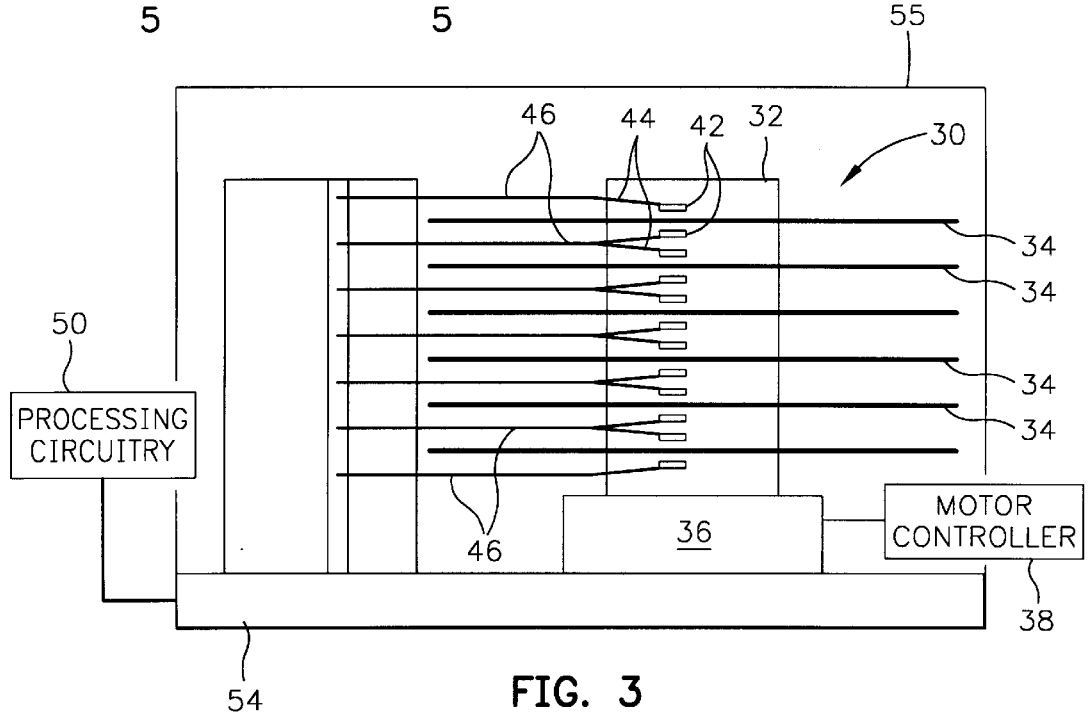
FIG. 3 is an elevation view of the magnetic disk drive wherein multiple disks and magnetic heads are employed.
Figure 4:
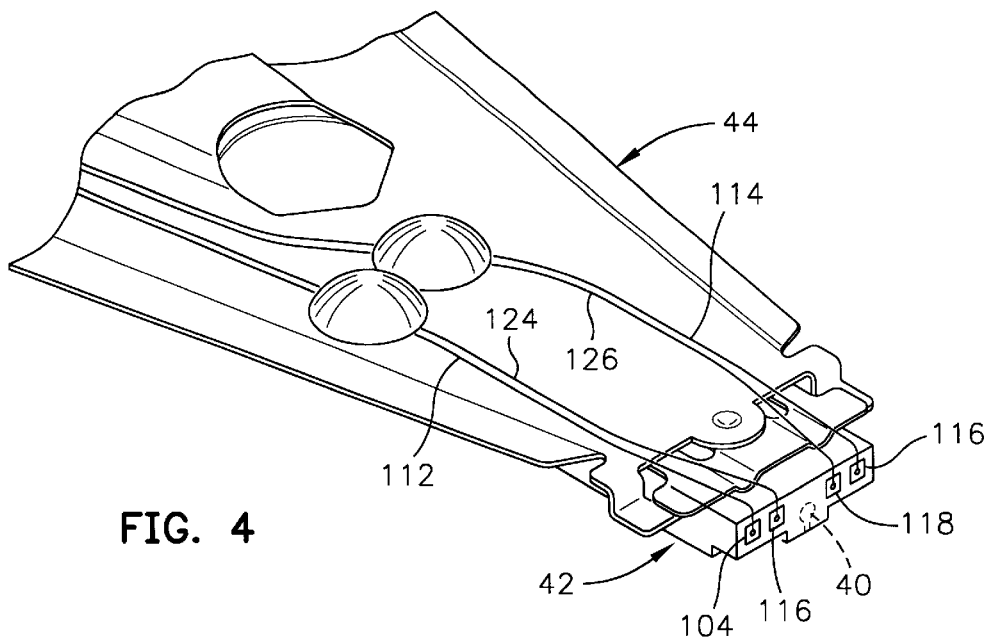
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
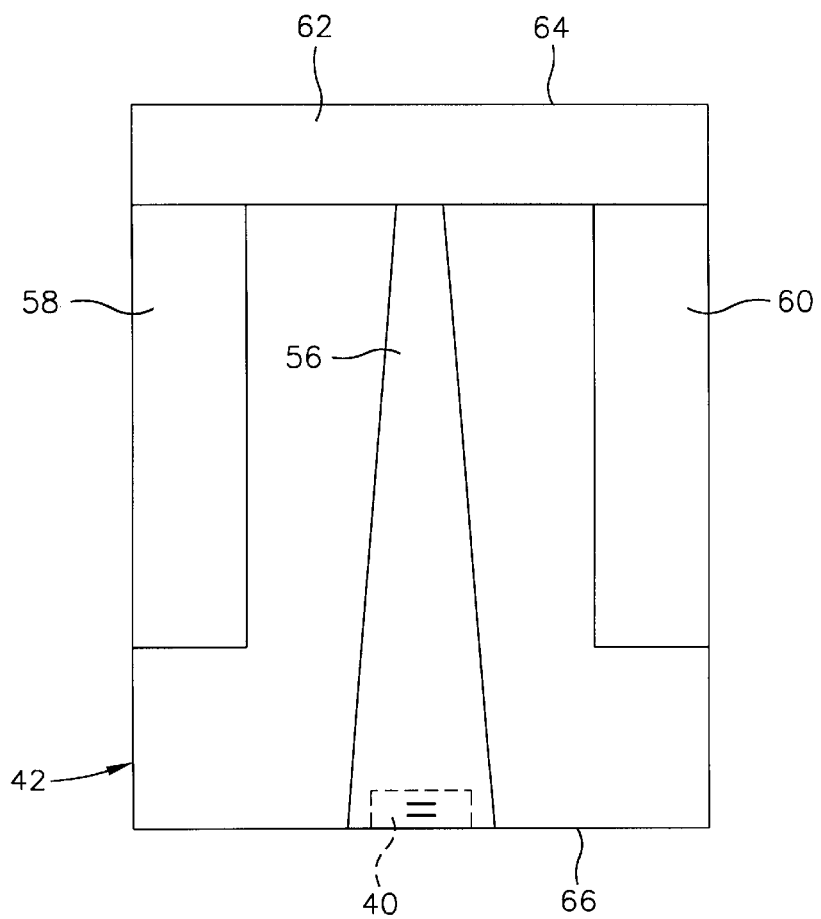
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
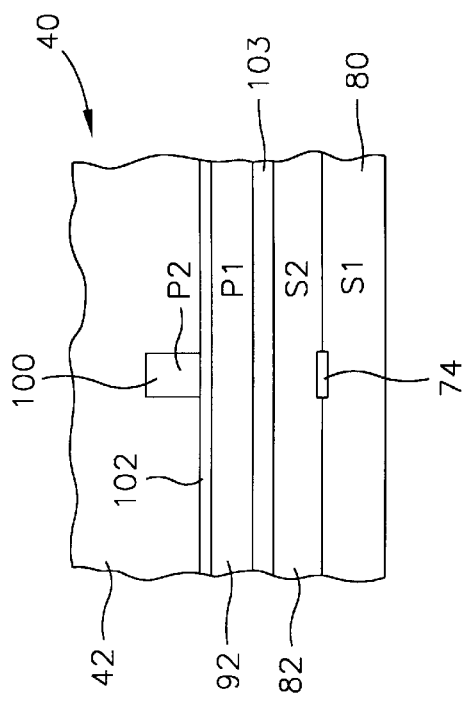
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between ferromagnetic first and second shield layers 80 and 82. In response to external magnetic fields, the resistance of the spin valve sensor 74 changes. A sense current ($I_S$) conducted through the sensor causes these resistance changes to be manifested as potential changes. These potential changes are then processed as readback signals by the processing circuitry 50 shown in FIG. 3.

Figure 10:
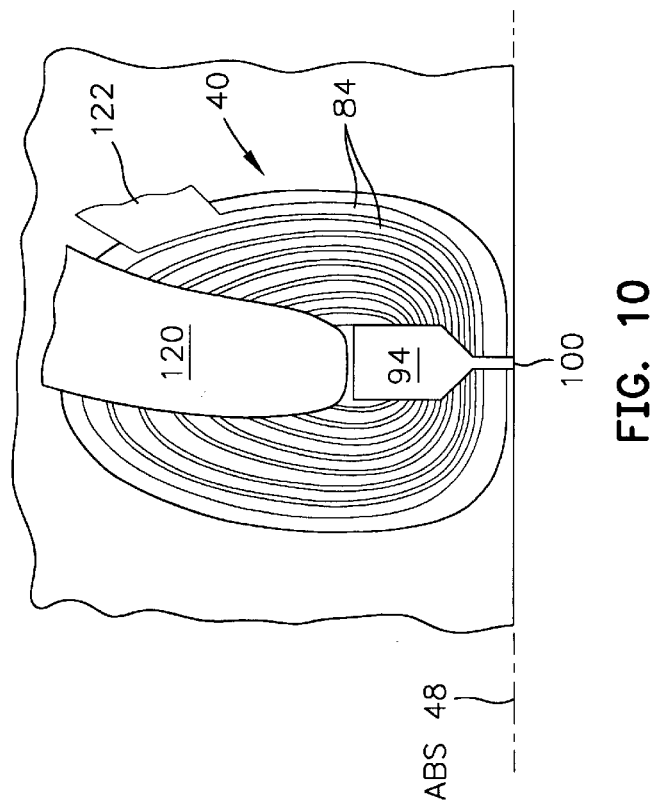
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
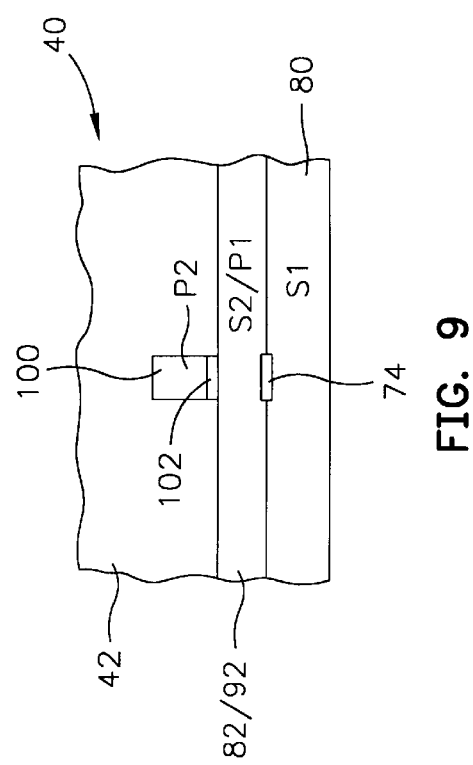
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
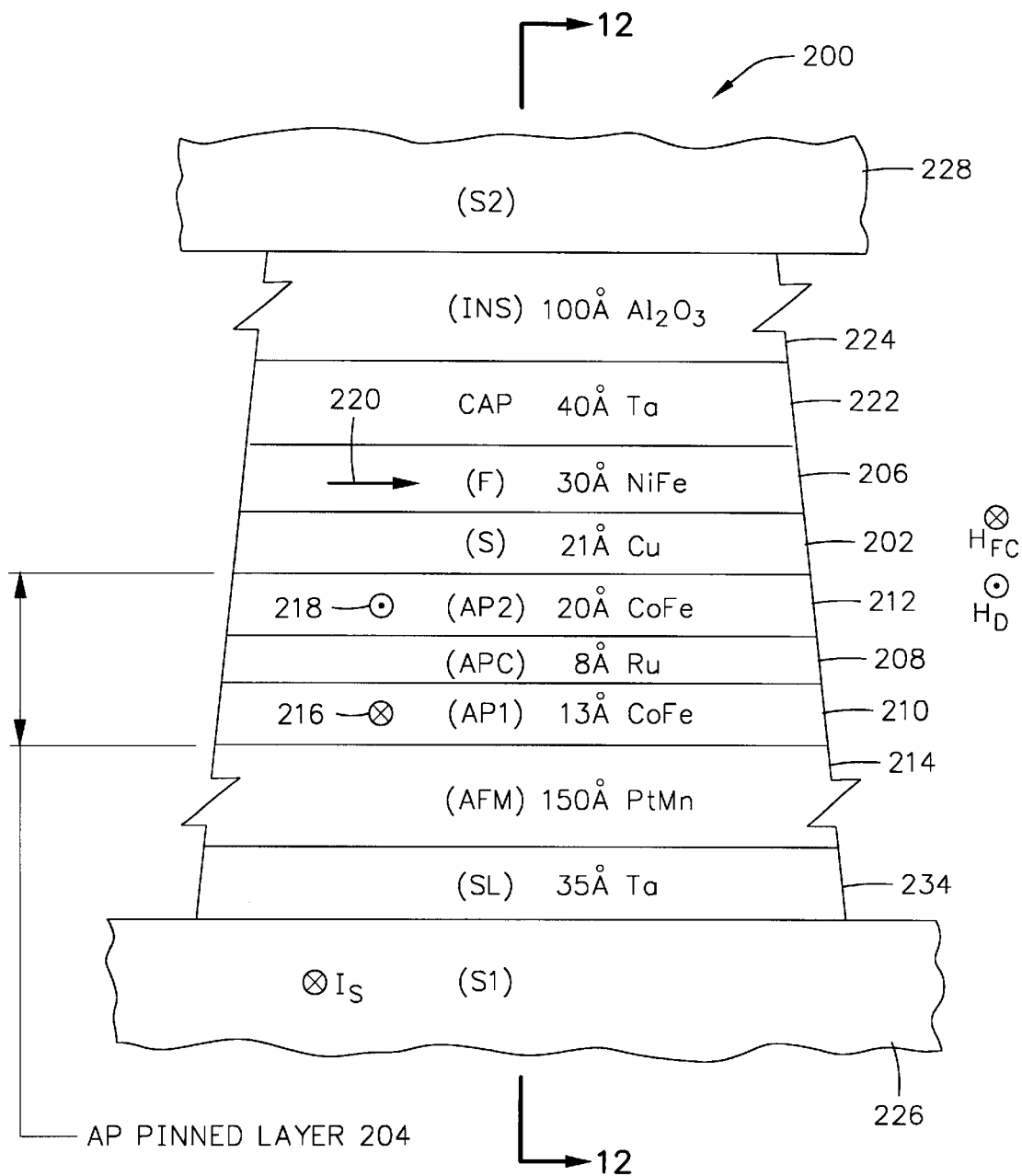
FIG. 11 is an ABS illustration of the present spin valve sensor.
Figure 12:
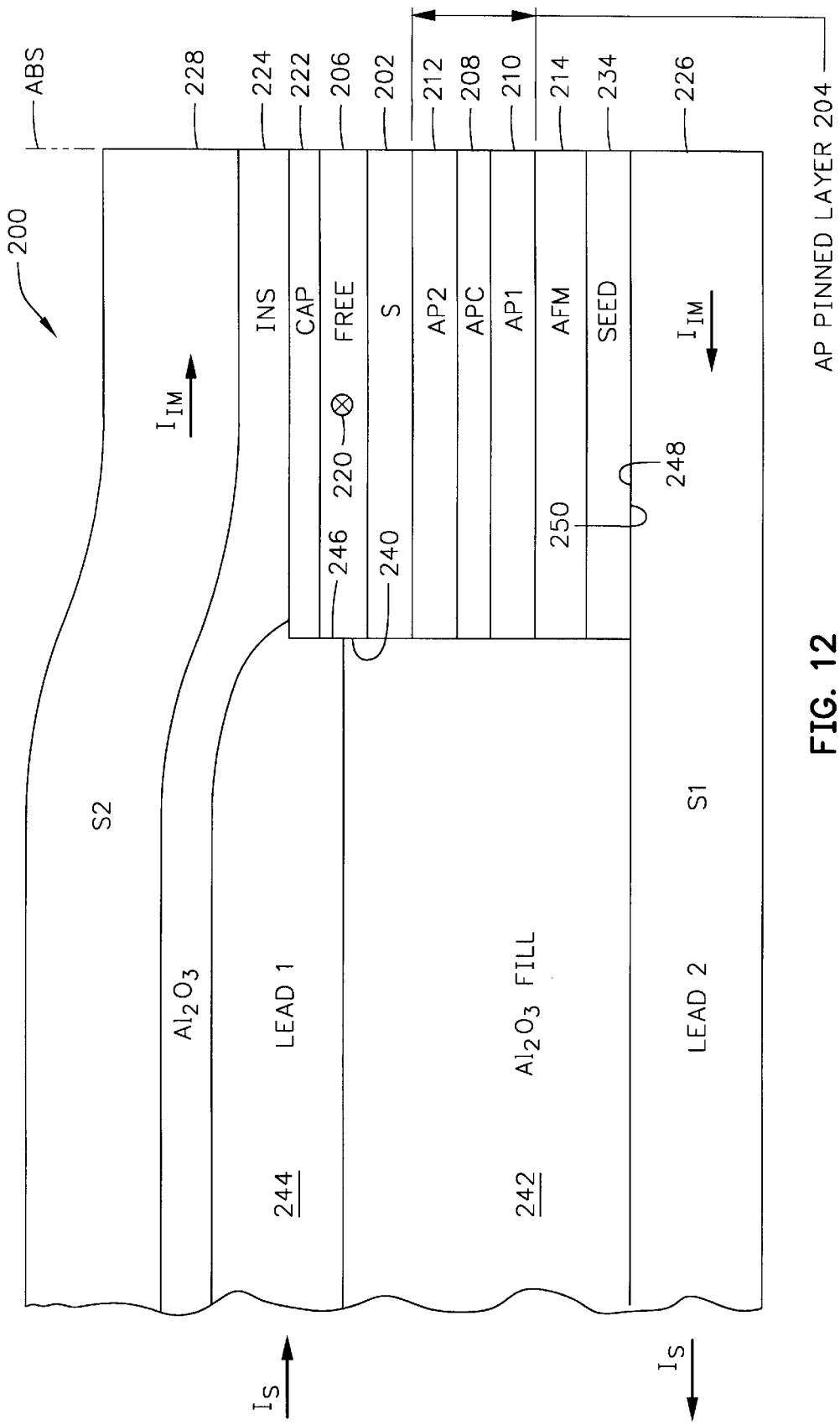
FIG. 12 is a view taken along plane 12—12 of FIG. 11.

In FIG. 11 there is shown an ABS illustration of the present spin valve read head 200 and FIG. 12 is a longitudinal cross-sectional view taken along plane 12—12 of FIG. 11. The spin valve read head 200 includes a nonmagnetic conductive spacer layer (S) 202 which is located between a pinned layer structure 204 and a free layer (F) 206. The pinned layer structure 204 is preferably an antiparallel (AP) pinned layer which has an antiparallel coupling (APC) layer 208 which is located between ferromagnetic first and second AP pinned layers (AP1) and (AP2) 210 and 212. An antiferromagnetic (AFM) pinning layer 214 is exchange coupled to the first AP pinned layer 210 for pinning a magnetic moment 216 of the first AP pinned layer perpendicular to the ABS, such as into the page as shown in FIG. 11. By a strong antiparallel coupling between the first and second AP pinned layers 210 and 212 the second AP pinned layer 212 has a magnetic moment 218 which is antiparallel to the magnetic moment 216. Since there is partial flux closure between the first and second AP pinned layers 210 and 212 the AP pinned layer structure produces a significantly lower net demagnetizing field HD as compared to a pinned layer which is composed of only one ferromagnetic film. The free layer 206 has a magnetic moment 220 which is directed parallel to the ABS and the film surfaces of the layers of the spin valve sensor, which may be directed from left to right as shown in FIG. 11. When a signal field from a rotating magnetic disk rotates the magnetic moment 220 upwardly into the head the magnetic moments 218 and 220 become more antiparallel which increases the resistance of the head and when a signal field rotates the magnetic moment 220 downwardly out of the head the magnetic moments 218 and 220 become more parallel which reduces the resistance of the sensor. These changes in the resistance of the sensor cause potential changes in the sense current circuit which are processed as playback signals by the processing circuitry 50 in FIG. 3. A cap layer 222 may be located on the free layer 206 for protecting it from subsequent processing steps and an insulation layer 224 may be located on the cap layer 222, which will be described in more detail hereinafter. The aforementioned layers, which constitute a spin valve sensor, are located between ferromagnetic first and second shield layers (S1) and (S2) 226 and 228. First, second and third seed layers (SL1), (SL2) and (SL3) 230, 232 and 234 may be located between the first shield layer 226 and the pinning layer 214.

As best seen in FIG. 12, each of the AP pinned layer 204, the pinning layer 214, the spacer layer 202, the free layer 206, the seed layer 230 and the first and second shield layers 226 and 228 have top and bottom film surfaces which are bounded by front and back edges and first and second side edges (see FIG. 11) wherein the front edges are located at or closer to the ABS than the back edges. In the read head 200 the front edges of all of these layers are located at the ABS. The back edge of the free layer 206 is shown at 240 in FIG. 12 which will be discussed in more detail hereinafter. As shown in FIG. 12 the insulation layer 224 extends from the ABS past the back edges of the layers of the spin valve sensor and a second insulation layer 242 abuts the back edges of the layers of the spin valve sensor and extends back into the head. As shown in FIG. 12, the read head is provided with a first lead layer 244 which has top and bottom film surfaces, which are partially bounded by first and second side edges (not shown) and a front edge 246. The front edge 246 of the first lead layer abuts the back edge 240 of the free layer for electrical connection thereto. The advantage of this connection will be discussed in more detail hereinbelow. The top film surface of the first shield layer 226 is shown at 248 and the bottom film surface of the seed layer 234 is shown at 250 in FIG. 12. These film surfaces interface one another so that the first shield layer 226 is electrically connected to the spin valve sensor. With this arrangement the first shield layer 226 serves as a second lead layer. The first and second lead layers 244 and 226 are connected to the processing circuitry 50 in FIG. 3 for receiving and conducting a sense current $I_S$ through the layers of the spin valve sensor.

With connection of the first and second leads 244 and 226 to the spin valve sensor, as shown in FIG. 12, the connection between the first lead 244 and the free layer 206 causes the sense current to be conducted through the free layer parallel to the planes of its film surfaces, which is referred to in the art as current in plane (CIP). From the free layer 206 the sense current $I_S$ is conducted through the remainder of the layers of the spin valve sensor perpendicular to the planes of the films of these layers, which is referred to in the art as current perpendicular to the planes of the layers (CPP). The sense current is then returned to the processing circuitry by the first shield layer 226 which serves as the second lead layer.

By conducting the sense current parallel to the planes of the film surfaces of the free layer 206 the resistance of the spin valve sensor to the sense current is increased compared to conducting the sense current perpendicular to all of the planes of the film surfaces of the layers of the spin valve sensor. This increase in resistance is sufficiently high to permit the processing circuitry 50 in FIG. 3 to efficiently detect potential changes due to resistance changes of the spin valve sensor caused by rotation of the magnetic moment 220 in FIG. 11 in response to signal fields.

As stated hereinabove, the AP pinned layer 204 has a low net demagnetizing field $H_D$ which is exerted on the free layer 206. The second AP pinned layer 212 exerts a ferromagnetic coupling field $H_{FC}$ on the free layer 206 which can be oriented antiparallel to the net demagnetizing field $H_D$, as shown in FIG. 11. The pinning layer 214 is preferably composed of platinum manganese (PtMn), the first seed layer 230 is preferably compoised of $Al_2O_3$, the second seed layer 232 is preferably composed of nickel manganese oxide (NiMnO) and the third seed layer 234 is preferably composed of tantalum (Ta). With proper selection of the thicknesses of the seed layers and the spacer layer 202, discussed hereinbelow, the ferromagnetic coupling field $H_{FC}$ can be negative which means its direction is antiparallel to the magnetic moment 218. It should be noted that there is no sense current field exerted on the free layer 206 in the present invention. Accordingly, in the preferred embodiment the ferromagnetic coupling field $H_{FC}$ completely counterbalances the demagnetizing field $H_D$ so that the free layer structure 206 is properly biased for readback symmetry.

Figure 13:
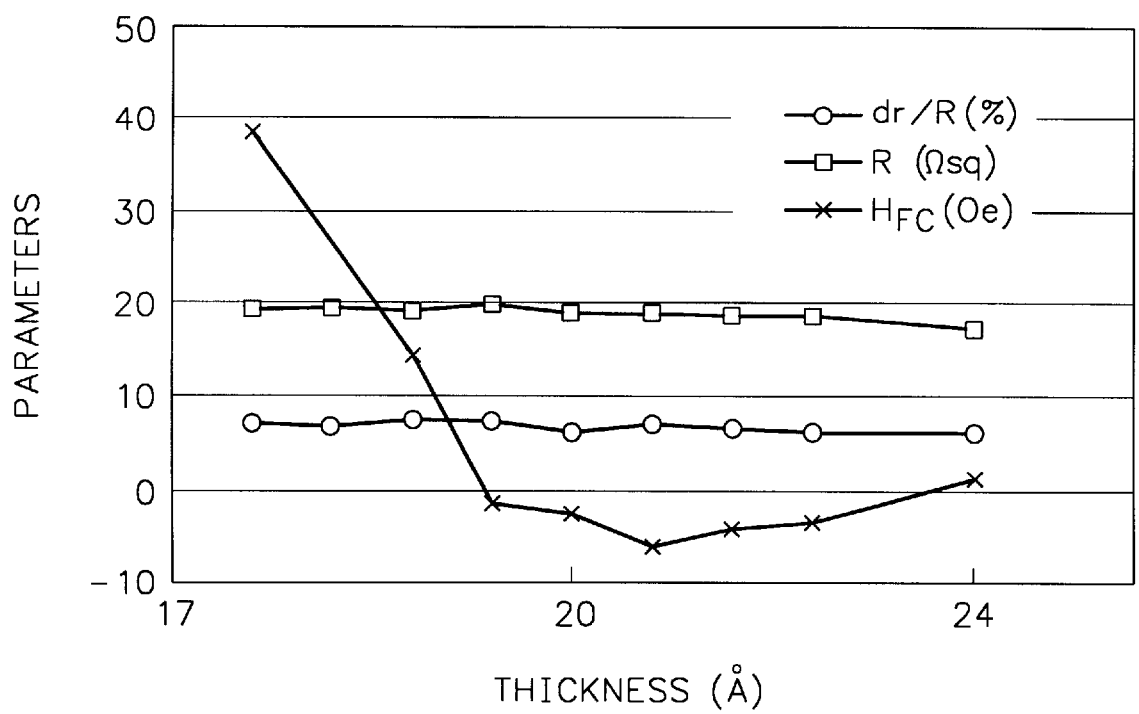
FIG. 13 is a graph showing various parameters of the read head.

Various parameters of the read head 200 are shown in the graph in FIG. 13. The abscissa shows variations in the thickness of the copper spacer layer 202 and the ordinate shows the various parameters which are ferromagnetic coupling field $H_{FC}$, resistance R of the sensor and magnetoresistive coefficient dr/R. It can be seen that when the thickness of the spacer layer 202 is in the range of approximately 19 Å to 24 Å the ferromagnetic coupling field $H_{FC}$ is negative and that for other thicknesses the ferromagnetic coupling field $H_{FC}$ is positive. When the thickness of the spacer layer 202 is 21 Å the negative ferromagnetic coupling field $-H_{FC}$ is at a maximum of approximately -5 Oe.

In a still further preferred embodiment the free layer 206 is located closer to the second shield layer 228 than to the first shield layer 226. It should be understood that the sense current Is in the first lead layer 244 and the free layer 206 causes an image current Im in each of the first and second shield layers 226 and 228. These image currents produce image current fields on the free layer 206 which are opposed to one another and completely counterbalance each other when the free layer 206 is symmetrically located between the first and second shield layers 226 and 228. In the present invention, by locating the free layer 206 closer to the second shield layer 228 there is a net image sense current field 250 which is exerted on the free layer structure parallel to the planes of its film surfaces and to the ABS and which is directed into the paper, as shown in FIG. 12. Accordingly, the net image sense current field is directed such that it will stabilize the magnetic domains of the free layer 206 for enhanced operation of the spin valve sensor.

Exemplary thicknesses and materials for the various layers of the spin valve sensor are 2 μm of nickel iron (NiFe) for the first shield layer 226, 35 Å of tantalum (Ta) for the seed layer 234, 150 Å of platinum manganese (PtMn) for the pinning layer 214, 13 Å of cobalt iron (CoFe) for the first AP pinned layer 210, 8 Å of ruthenium (Ru) for the antiparallel coupling layer 208, 20 Å of cobalt iron (CoFe) for the second AP pinned film 212, 21 Å of copper (Cu) for the spacer layer 202, 30 Å of nickel iron (NiFe) for the free layer 206, 40 Å of tantalum (Ta) for the cap layer 222, 100 Å of aluminum oxide ($Al_2O_3$) for the first insulation layer 224, 2 μm of nickel iron (NiFe) for the second shield layer 228, and 250 Å of aluminum oxide ($Al_2O_3$) for the second insulation layer 242.

Discussion

It should be understood that the pinned layer structure 204 may be a single ferromagnetic film or multiple films exchange coupled together in lieu of an AP pinned layer 204. Further, the free layer 206 in FIG. 11 may include multiple films, such as a 15 Å nickel iron (NiFe) film and a 15 Å cobalt iron (CoFe) film located between the nickel iron (NiFe) film and the spacer layer 202. The cobalt iron (CoFe) film has been found to promote the magnetoresistive coefficient dr/R of the spin valve sensor. Further, the seed layer 230 may be a material other than tantalum (Ta), such as nickel iron chromium (NiFeCr) or chromium (Cr). The seed layer structure has been known to promote a negative ferromagnetic coupling field $H_{FC}$ as discussed hereinabove. It should further be understood that the first and second insulation layers 224 and 242 may be other insulative materials other than aluminum oxide ($Al_2O_3$), such as silicon dioxide ($SiO_2$) or aluminum nitride (AlN). The first lead layer 244 may be gold (Au). The read head 200, shown in FIGS. 11 and 12, may be used as the read head 72 in the magnetic head assembly shown in FIG. 6 or 7. The invention also includes the method of making the read head, as shown in FIGS. 11 and 12, as well as the magnetic head assemblies in FIGS. 6 and 7.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head, which has an air bearing surface (ABS), comprising:
   a ferromagnetic pinned layer structure having a magnetic moment;
   an antiferromagnetic pinning layer exchange coupled to the pinned layer structure for pinning the magnetic moment of the pinned layer in a predetermined direction;

a ferromagnetic free layer structure;

a nonmagnetic conductive spacer layer located between the free and pinned layers;

ferromagnetic first and second shield layers;

the pinned layer structure, the pinning layer, the spacer layer and the free layer structure being located between the first and second shield layers;

each of the pinned layer structure, the pinning layer, the spacer layer, the free layer structure and the first and second shield layers having top and bottom film surfaces bounded by front and back edges and first and second side edges wherein the front edges are located at or closer to the ABS than the back edges;

first and second insulation layers located between the first and second shield layers;

a first lead layer located between the first and second insulation layers and having top and bottom film surfaces bounded in part by a front edge and first and second side edges;

the front edge of the first lead layer being directly connected to the back edge of the free layer structure for electrical connection thereto; and one of the first and second shield layers being a second lead layer and having one of its first and second film surfaces electrically connected to one of the first and second film surfaces of the pinning layer.

2. A magnetic read head as claimed in claim 1 wherein the pinned layer structure is an antiparallel pinned layer structure which includes:

ferromagnetic first and second AP pinned films wherein each AP pinned film has a magnetic moment; and an AP coupling film between the first and second AP pinned films which permits the magnetic moments of the AP pinned films to be antiparallel.

3. A magnetic read head as claimed in claim 1 including:

each of the first lead layer and the free layer structure being closer to the first shield layer than the second shield layer so that the first and second shield layers exert a net image current field on the free layer structure that is oriented parallel to the ABS and parallel to the first and second film surfaces of the free layer structure for stabilizing magnetic domains of the free layer structure.

4. A magnetic read head as claimed in claim 3 wherein the pinned layer structure is an antiparallel pinned layer structure which includes:

ferromagnetic first and second AP pinned films wherein each AP pinned film has a magnetic moment; and an AP coupling film between the first and second AP pinned films which permits the magnetic moments of the AP pinned films to be antiparallel.

5. A magnetic read head, which has an air bearing surface (ABS), comprising:

a ferromagnetic pinned layer structure having a magnetic moment;

an antiferromagnetic pinning layer exchange coupled to the pinned layer structure for pinning the magnetic moment of the pinned layer in a predetermined direction;

a ferromagnetic free layer structure;

a nonmagnetic conductive spacer layer located between the free and pinned layers;

ferromagnetic first and second shield layers;

the pinned layer structure, the pinning layer, the spacer layer and the free layer structure being located between the first and second shield layers;

each of the pinned layer structure, the pinning layer, the spacer layer, the free layer structure and the first and second shield layers having top and bottom film surfaces bounded by front and back edges and first and second side edges wherein the front edges are located at or closer to the ABS than the back edges;

first and second insulation layers located between the first and second shield layers;

a first lead layer located between the first and second insulation layers and having top and bottom film surfaces bounded in part by a front edge and first and second side edges;

the front edge of the first lead layer being directly connected to the back edge of the free layer structure for electrical connection thereto;

one of the first and second shield layers being a second lead layer and having one of its first and second film surfaces electrically connected to one of the first and second film surfaces of the pinning layer;

the pinned layer structure being an antiparallel pinned layer structure which includes:

ferromagnetic first and second AP pinned films wherein each AP pinned film has a magnetic moment; and an AP coupling film between the first and second AP pinned films which permits the magnetic moments of the AP pinned films to be antiparallel; and a net demagnetizing field from the pinned layer structure on the free layer structure being counterbalanced by a ferromagnetic coupling field from the pinned layer structure on the free layer structure.

6. A magnetic read head, which has an air bearing surface (ABS), comprising:

a ferromagnetic pinned layer structure having a magnetic moment;

an antiferromagnetic pinning layer exchange coupled to the pinned layer structure for pinning the magnetic moment of the pinned layer in a predetermined direction;

a ferromagnetic free layer structure;

a nonmagnetic conductive spacer layer located between the free and pinned layers;

ferromagnetic first and second shield layers;

the pinned layer structure, the pinning layer, the spacer layer and the free layer structure being located between the first and second shield layers;

each of the pinned layer structure, the pinning layer, the spacer layer, the free layer structure and the first and second shield layers having top and bottom film surfaces bounded by front and back edges and first and second side edges wherein the front edges are located at or closer to the ABS than the back edges;

first and second insulation layers located between the first and second shield layers;

a first lead layer located between the first and second insulation layers and having top and bottom film surfaces bounded in part by a front edge and first and second side edges;

the front edge of the first lead layer being directly connected to the back edge of the free layer structure for electrical connection thereto;

one of the first and second shield layers being a second lead layer and having one of its first and second film surfaces electrically connected to one of the first and second film surfaces of the pinning layer;

each of the first lead layer and the free layer structure being closer to the first shield layer than the second shield layer so that the first and second shield layers exert a net image current field on the free layer structure that is oriented parallel to the ABS and parallel to the first and second film surfaces of the free layer structure for stabilizing magnetic domains of the free layer structure;

the pinned layer structure being an antiparallel pinned layer structure which includes:
ferromagnetic first and second AP pinned films wherein each AP pinned film has a magnetic moment; and
an AP coupling film between the first and second AP pinned films which permits the magnetic moments of the AP pinned films to be antiparallel; and a net demagnetizing field from the pinned layer structure on the free layer structure being counterbalanced by a ferromagnetic coupling field from the pinned layer structure on the free layer structure.

7. A magnetic head assembly comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
a read head including:
a ferromagnetic pinned layer structure having a magnetic moment;
an antiferromagnetic pinning layer exchange coupled to the pinned layer structure for pinning the magnetic moment of the pinned layer in a predetermined direction;
a ferromagnetic free layer structure;
a nonmagnetic conductive spacer layer located between the free and pinned layers;
ferromagnetic first and second shield layers;
the pinned layer structure, the pinning layer, the spacer layer and the free layer structure being located between the first and second shield layers;
each of the pinned layer structure, the pinning layer, the spacer layer, the free layer structure and the first and second shield layers having top and bottom film surfaces bounded by front and back edges and first and second side edges wherein the front edges are located at or closer to the ABS than the back edges;
first and second insulation layers located between the first and second shield layers;
a first lead layer located between the first and second insulation layers and having top and bottom film surfaces bounded in part by a front edge and first and second side edges;
the front edge of the first lead layer being directly connected to the back edge of the free layer structure for electrical connection thereto; and
one of the first and second shield layers being a second lead layer and having one of its first and second film surfaces electrically connected to one of the first and second film surfaces of the pinning layer.

8. A magnetic head assembly as claimed in claim 7 including a nonmagnetic isolation layer located between the second shield layer and the first pole piece layer.

9. A magnetic head assembly as claimed in claim 7 wherein the pinned layer structure is an antiparallel pinned layer structure which includes:
ferromagnetic first and second AP pinned films wherein each AP pinned film has a magnetic moment; and
an AP coupling film between the first and second AP pinned films which permits the magnetic moments of the AP pinned films to be antiparallel.

10. A magnetic head assembly as claimed in claim 7 including:
each of the first lead layer and the free layer structure being closer to the first shield layer than the second shield layer so that the first and second shield layers exert a net image current field on the free layer structure that is oriented parallel to the ABS and parallel to the first and second film surfaces of the free layer structure for stabilizing magnetic domains of the free layer structure.

11. A magnetic head assembly as claimed in claim 10 wherein the pinned layer structure is an antiparallel pinned layer structure which includes:
ferromagnetic first and second AP pinned films wherein each AP pinned film has a magnetic moment; and
an AP coupling film between the first and second AP pinned films which permits the magnetic moments of the AP pinned films to be antiparallel.

12. A magnetic head assembly comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
a read head including:
a ferromagnetic pinned layer structure having a magnetic moment;
an antiferromagnetic pinning layer exchange coupled to the pinned layer structure for pinning the magnetic moment of the pinned layer in a predetermined direction;
a ferromagnetic free layer structure;
a nonmagnetic conductive spacer layer located between the free and pinned layers;
ferromagnetic first and second shield layers;
the pinned layer structure, the pinning layer, the spacer layer and the free layer structure being located between the first and second shield layers;
each of the pinned layer structure, the pinning layer, the spacer layer, the free layer structure and the first and second shield layers having top and bottom film surfaces bounded by front and back edges and first and second side edges wherein the front edges are located at or closer to the ABS than the back edges;
first and second insulation layers located between the first and second shield layers;
a first lead layer located between the first and second insulation layers and having top and bottom film surfaces bounded in part by a front edge and first and second side edges;
the front edge of the first lead layer being directly connected to the back edge of the free layer structure for electrical connection thereto;

one of the first and second shield layers being a second lead layer and having one of its first and second film surfaces electrically connected to one of the first and second film surfaces of the pinning layer;

the pinned layer structure being an antiparallel pinned layer structure which includes:
ferromagnetic first and second AP pinned films wherein each AP pinned film has a magnetic moment; and
an AP coupling film between the first and second AP pinned films which permits the magnetic moments of the AP pinned films to be antiparallel;

a net demagnetizing field from the pinned layer structure on the free layer structure being counterbalanced by a ferromagnetic coupling field from the pinned layer structure on the free layer structure.

13. A magnetic head assembly comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
a read head including:
a ferromagnetic pinned layer structure having a magnetic moment;
an antiferromagnetic pinning layer exchange coupled to the pinned layer structure for pinning the magnetic moment of the pinned layer in a predetermined direction;
a ferromagnetic free layer structure;
a nonmagnetic conductive spacer layer located between the free and pinned layers;
ferromagnetic first and second shield layers;
the pinned layer structure, the pinning layer, the spacer layer and the free layer structure being located between the first and second shield layers;
each of the pinned layer structure, the pinning layer, the spacer layer, the free layer structure and the first and second shield layers having top and bottom film surfaces bounded by front and back edges and first and second side edges wherein the front edges are located at or closer to the ABS than the back edges;
first and second insulation layers located between the first and second shield layers;
a first lead layer located between the first and second insulation layers and having top and bottom film surfaces bounded in part by a front edge and first and second side edges;
the front edge of the first lead layer being directly connected to the back edge of the free layer structure for electrical connection thereto;
one of the first and second shield layers being a second lead layer and having one of its first and second film surfaces electrically connected to one of the first and second film surfaces of the pinning layer;
each of the first lead layer and the free layer structure being closer to the first shield layer than the second shield layer so that the first and second shield layers exert a net image current field on the free layer structure that is oriented parallel to the ABS and parallel to the first and second film surfaces of the free layer structure for stabilizing magnetic domains of the free layer structure;

the pinned layer structure being an antiparallel pinned layer structure which includes:
ferromagnetic first and second AP pinned films wherein each AP pinned film has a magnetic moment; and
an AP coupling film between the first and second AP pinned films which permits the magnetic moments of the AP pinned films to be antiparallel; and
a net demagnetizing field from the pinned layer structure on the free layer structure being counterbalanced by a ferromagnetic coupling field from the pinned layer structure on the free layer structure.

14. A magnetic disk drive including at least one magnetic head assembly that includes a write head and a read head, the read head including a spin valve sensor, comprising:
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
a ferromagnetic pinned layer structure having a magnetic moment;
an antiferromagnetic pinning layer exchange coupled to the pinned layer structure for pinning the magnetic moment of the pinned layer in a predetermined direction;
a ferromagnetic free layer structure;
a nonmagnetic conductive spacer layer located between the free and pinned layers;
ferromagnetic first and second shield layers;
the pinned layer structure, the pinning layer, the spacer layer and the free layer structure being located between the first and second shield layers;
each of the pinned layer structure, the pinning layer, the spacer layer, the free layer structure and the first and second shield layers having top and bottom film surfaces bounded by front and back edges and first and second side edges wherein the front edges are located at or closer to the ABS than the back edges;
first and second insulation layers located between the first and second shield layers;
a first lead layer located between the first and second insulation layers and having top and bottom film surfaces bounded in part by a front edge and first and second side edges;
the front edge of the first lead layer being directly connected to the back edge of the free layer structure for electrical connection thereto; and
one of the first and second shield layers being a second lead layer and having one of its first and second film surfaces electrically connected to one of the first and second film surfaces of the pinning layer;
a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head to multiple positions with respect to said magnetic disk; and a processor connected to the magnetic head, to the spindle motor and to the actuator for exchanging signals with the magnetic head, for controlling movement of the magnetic disk and for controlling the position of the magnetic head.

15. A magnetic disk drive as claimed in claim 14 including a nonmagnetic isolation layer located between the second shield layer and the first pole piece layer.

16. A magnetic disk drive as claimed in claim 14 wherein the pinned layer structure is an antiparallel pinned layer structure which includes:
   ferromagnetic first and second AP pinned films wherein each AP pinned film has a magnetic moment; and
   an AP coupling film between the first and second AP pinned films which permits the magnetic moments of the AP pinned films to be antiparallel.

17. A magnetic disk drive as claimed in claim 14 including:
   each of the first lead layer and the free layer structure being closer to the first shield layer than the second shield layer so that the first and second shield layers exert a net image current field on the free layer structure that is oriented parallel to the ABS and parallel to the first and second film surfaces of the free layer structure for stabilizing magnetic domains of the free layer structure.

18. A magnetic disk drive as claimed in claim 17 wherein the pinned layer structure is an antiparallel pinned layer structure which includes:
   ferromagnetic first and second AP pinned films wherein each AP pinned film has a magnetic moment; and
   an AP coupling film between the first and second AP pinned films which permits the magnetic moments of the AP pinned films to be antiparallel.

19. A magnetic disk drive including at least one magnetic head assembly that includes a write head and a read head, the read head including a spin valve sensor, comprising:
   the write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions; and
   the read head including:
      a ferromagnetic pinned layer structure having a magnetic moment;
      an antiferromagnetic pinning layer exchange coupled to the pinned layer structure for pinning the magnetic moment of the pinned layer in a predetermined direction;
   a ferromagnetic free layer structure;
      a nonmagnetic conductive spacer layer located between the free and pinned layers;
      ferromagnetic first and second shield layers;
      the pinned layer structure, the pinning layer, the spacer layer and the free layer structure being located between the first and second shield layers;
      each of the pinned layer structure, the pinning layer, the spacer layer, the free layer structure and the first and second shield layers having top and bottom film surfaces bounded by front and back edges and first and second side edges wherein the front edges are located at or closer to the ABS than the back edges;
      first and second insulation layers located between the first and second shield layers;
      a first lead layer located between the first and second insulation layers and having top and bottom film surfaces bounded in part by a front edge and first and second side edges;
      the front edge of the first lead layer being directly connected to the back edge of the free layer structure for electrical connection thereto;
      one of the first and second shield layers being a second lead layer and having one of its first and second film surfaces electrically connected to one of the first and second film surfaces of the pinning layer;
      the pinned layer structure being an antiparallel pinned layer structure which includes:
         ferromagnetic first and second AP pinned films wherein each AP pinned film has a magnetic moment; and
         an AP coupling film between the first and second AP pinned films which permits the magnetic moments of the AP pinned films to be antiparallel; and
   a net demagnetizing field from the pinned layer structure on the free layer structure being counterbalanced by a ferromagnetic coupling field from the pinned layer structure on the free layer structure;
   a housing;
   a magnetic disk rotatably supported in the housing;
   a support mounted in the housing for supporting the magnetic head assembly with said ABS facing the magnetic disk so that the magnetic head assembly is in a transducing relationship with the magnetic disk;
   a spindle motor for rotating the magnetic disk;
   an actuator positioning means connected to the support for moving the magnetic head to multiple positions with respect to said magnetic disk; and
   a processor connected to the magnetic head, to the spindle motor and to the actuator for exchanging signals with the magnetic head, for controlling movement of the magnetic disk and for controlling the position of the magnetic head.

20. A magnetic disk drive including at least one magnetic head assembly that includes a write head and a read head, the read head including a spin valve sensor, comprising:
   the write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions; and
   the read head including:
      a ferromagnetic pinned layer structure having a magnetic moment;
      an antiferromagnetic pinning layer exchange coupled to the pinned layer structure for pinning the magnetic moment of the pinned layer in a predetermined direction;
   a ferromagnetic free layer structure;
      a nonmagnetic conductive spacer layer located between the free and pinned layers;

ferromagnetic first and second shield layers;
the pinned layer structure, the pinning layer, the spacer layer and the free layer structure being located between the first and second shield layers;
each of the pinned layer structure, the pinning layer, the spacer layer, the free layer structure and the first and second shield layers having top and bottom film surfaces bounded by front and back edges and first and second side edges wherein the front edges are located at or closer to the ABS than the back edges;
first and second insulation layers located between the first and second shield layers;
a first lead layer located between the first and second insulation layers and having top and bottom film surfaces bounded in part by a front edge and first and second side edges;
the front edge of the first lead layer being directly connected to the back edge of the free layer structure for electrical connection thereto;
one of the first and second shield layers being a second lead layer and having one of its first and second film surfaces electrically connected to one of the first and second film surfaces of the pinning layer;
each of the first lead layer and the free layer structure being closer to the first shield layer than the second shield layer so that the first and second shield layers exert a net image current field on the free layer structure that is oriented parallel to the ABS and parallel to the first and second film surfaces of the free layer structure for stabilizing magnetic domains of the free layer structure;
the pinned layer structure being an antiparallel pinned layer structure which includes:
ferromagnetic first and second AP pinned films wherein each AP pinned film has a magnetic moment; and
an AP coupling film between the first and second AP pinned films which permits the magnetic moments of the AP pinned films to be antiparallel; and
a net demagnetizing field from the pinned layer structure on the free layer structure being counterbalanced by a ferromagnetic coupling field from the pinned layer structure on the free layer structure;
a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head to multiple positions with respect to said magnetic disk; and
a processor connected to the magnetic head, to the spindle motor and to the actuator for exchanging signals with the magnetic head, for controlling movement of the magnetic disk and for controlling the position of the magnetic head.

21. A method of making a magnetic read head, which has an air bearing surface (ABS), comprising the steps of:
forming a ferromagnetic pinned layer structure which has a magnetic moment;
forming an antiferromagnetic pinning layer exchange coupled to the pinned layer structure for pinning the magnetic moment of the pinned layer in a predetermined direction;
forming a ferromagnetic free layer structure;
forming a nonmagnetic conductive spacer layer between the free and pinned layers;
forming ferromagnetic first and second shield layers with the pinned layer structure, the pinning layer, the spacer layer and the free layer structure located between the first and second shield layers;
each of the pinned layer structure, the pinning layer, the spacer layer, the free layer structure and the first and second shield layers being formed with top and bottom film surfaces bounded by front and back edges and first and second side edges wherein the front edges are located at or closer to the ABS than the back edges;
forming first and second insulation layers between the first and second shield layers;
forming a first lead layer between the first and second insulation layers with top and bottom film surfaces bounded in part by a front edge and first and second side edges and with the front edge of the first lead layer directly connected to the back edge of the free layer structure; and
one of the shield layers being a second lead layer and being formed with one of its first and second film surfaces electrically connected to one of the first and second film surfaces of the pinning layer.

22. A method of making a magnetic read head as claimed in claim 21 wherein the pinned layer structure is formed as an antiparallel pinned layer structure comprising the steps of:
forming ferromagnetic first and second AP pinned films wherein each AP pinned film has a magnetic moment; and
forming an AP coupling film between the first and second AP pinned films which permits the magnetic moments of the AP pinned films to be antiparallel.

23. A method of making a magnetic read head as claimed in claim 21 including:
each of the first lead layer and the free layer structure being formed closer to the first shield layer than the second shield layer so that the first and second shield layers exert a net image current field on the free layer structure that is oriented parallel to the ABS and parallel to the first and second film surfaces of the free layer structure for stabilizing magnetic domains of the free layer structure.

24. A method of making a magnetic read head as claimed in claim 23 wherein the pinned layer structure is formed as an antiparallel pinned layer structure comprising the steps of:
forming ferromagnetic first and second AP pinned films wherein each AP pinned film has a magnetic moment; and
forming an AP coupling film between the first and second AP pinned films which permits the magnetic moments of the AP pinned films to be antiparallel.

25. A method of making a magnetic read head, which has an air bearing surface (ABS), comprising the steps of:
forming a ferromagnetic pinned layer structure which has a magnetic moment;
forming an antiferromagnetic pinning layer exchange coupled to the pinned layer structure for pinning the magnetic moment of the pinned layer in a predetermined direction;
forming a ferromagnetic free layer structure;
forming a nonmagnetic conductive spacer layer between the free and pinned layers;

forming ferromagnetic first and second shield layers with the pinned layer structure, the pinning layer, the spacer layer and the free layer structure located between the first and second shield layers;

each of the pinned layer structure, the pinning layer, the spacer layer, the free layer structure and the first and second shield layers being formed with top and bottom film surfaces bounded by front and back edges and first and second side edges wherein the front edges are located at or closer to the ABS than the back edges;

forming first and second insulation layers between the first and second shield layers;

forming a first lead layer between the first and second insulation layers with top and bottom film surfaces bounded in part by a front edge and first and second side edges and with the front edge of the first lead layer directly connected to the back edge of the free layer structure;

one of the shield layers being a second lead layer and being formed with one of its first and second film surfaces electrically connected to one of the first and second film surfaces of the pinning layer;

the pinned layer structure being formed as an antiparallel pinned layer structure comprising the steps of:
  forming ferromagnetic first and second AP pinned films wherein each AP pinned film has a magnetic moment; and
  forming an AP coupling film between the first and second AP pinned films which permits the magnetic moments of the AP pinned films to be antiparallel; and the pinned layer structure and the spacer layer being formed so that a net demagnetizing field from the pinned layer structure on the free layer structure is counterbalanced by a ferromagnetic coupling field from the pinned layer structure on the free layer structure.

26. A method of making a magnetic read head, which has an air bearing surface (ABS), comprising the steps of:

forming a ferromagnetic pinned layer structure which has a magnetic moment;

forming an antiferromagnetic pinning layer exchange coupled to the pinned layer structure for pinning the magnetic moment of the pinned layer in a predetermined direction;

forming a ferromagnetic free layer structure;

forming a nonmagnetic conductive spacer layer between the free and pinned layers;

forming ferromagnetic first and second shield layers with the pinned layer structure, the pinning layer, the spacer layer and the free layer structure located between the first and second shield layers;

each of the pinned layer structure, the pinning layer, the spacer layer, the free layer structure and the first and second shield layers being formed with top and bottom film surfaces bounded by front and back edges and first and second side edges wherein the front edges are located at or closer to the ABS than the back edges;

forming first and second insulation layers between the first and second shield layers;

forming a first lead layer between the first and second insulation layers with top and bottom film surfaces bounded in part by a front edge and first and second side edges and with the front edge of the first lead layer directly connected to the back edge of the free layer structure;

one of the shield layers being a second lead layer and being formed with one of its first and second film surfaces electrically connected to one of the first and second film surfaces of the pinning layer;

each of the first lead layer and the free layer structure being formed closer to the first shield layer than the second shield layer so that the first and second shield layers exert a net image current field on the free layer structure that is oriented parallel to the ABS and parallel to the first and second film surfaces of the free layer structure for stabilizing magnetic domains of the free layer structure;

the pinned layer structure being formed as an antiparallel pinned layer structure comprising the steps of:
  forming ferromagnetic first and second AP pinned films wherein each AP pinned film has a magnetic moment; and
  forming an AP coupling film between the first and second AP pinned films which permits the magnetic moments of the AP pinned films to be antiparallel; and the pinned layer structure and the spacer layer being formed so that a net demagnetizing field from the pinned layer structure on the free layer structure is counterbalanced by a ferromagnetic coupling field from the pinned layer structure on the free layer structure.

27. A method of making a magnetic head assembly comprising the steps of:

making a write head as follows:
  forming ferromagnetic first and second pole piece layers that have a yoke portion located between a pole tip portion and a back gap portion;
  forming a nonmagnetic write gap layer between the pole tip portions of the first and second pole piece layers;
  forming an insulation stack with at least one coil layer embedded therein between the yoke portions of the first and second pole piece layers; and
  connecting the first and second pole piece layers at their back gap portions; and making a read head as follows:
  forming a ferromagnetic pinned layer structure which has a magnetic moment;
  forming an antiferromagnetic pinning layer exchange coupled to the pinned layer structure for pinning the magnetic moment of the pinned layer in a predetermined direction;
  forming a ferromagnetic free layer structure;
  forming a nonmagnetic conductive spacer layer between the free and pinned layers;
  forming ferromagnetic first and second shield layers with the pinned layer structure, the pinning layer, the spacer layer and the free layer structure located between the first and second shield layers;
  each of the pinned layer structure, the pinning layer, the spacer layer, the free layer structure and the first and second shield layers being formed with top and bottom film surfaces bounded by front and back edges and first and second side edges wherein the front edges are located at or closer to the ABS than the back edges;
  forming first and second insulation layers between the first and second shield layers;
  forming a first lead layer between the first and second insulation layers with top and bottom film surfaces bounded in part by a front edge and first and second side edges and with the front edge of the first lead layer directly connected to the back edge of the free layer structure; and one of the shield layers being a second lead layer and being formed with one of its first and second film surfaces electrically connected to one of the first and second film surfaces of the pinning layer.

28. A method of making a magnetic head assembly as claimed in claim 27 including forming a nonmagnetic isolation layer between the second shield layer and the first pole piece layer.

29. A method of making a magnetic head assembly as claimed in claim 27 wherein the pinned layer structure is formed as an antiparallel pinned layer structure comprising the steps of:

forming ferromagnetic first and second AP pinned films wherein each AP pinned film has a magnetic moment; and forming an AP coupling film between the first and second AP pinned films which permits the magnetic moments of the AP pinned films to be antiparallel.

30. A method of making a magnetic head assembly as claimed in claim 27 including:

each of the first lead layer and the free layer structure being formed closer to the first shield layer than the second shield layer so that the first and second shield layers exert a net image current field on the free layer structure that is oriented parallel to the ABS and parallel to the first and second film surfaces of the free layer structure for stabilizing magnetic domains of the free layer structure.

31. A method of making a magnetic head assembly as claimed in claim 30 wherein the pinned layer structure is formed as an antiparallel pinned layer structure comprising the steps of:

forming ferromagnetic first and second AP pinned films wherein each AP pinned film has a magnetic moment; and forming an AP coupling film between the first and second AP pinned films which permits the magnetic moments of the AP pinned films to be antiparallel.

32. A method of making a magnetic head assembly comprising the steps of:

making a write head as follows:

forming ferromagnetic first and second pole piece layers that have a yoke portion located between a pole tip portion and a back gap portion;

forming a nonmagnetic write gap layer between the pole tip portions of the first and second pole piece layers;

forming an insulation stack with at least one coil layer embedded therein between the yoke portions of the first and second pole piece layers; and connecting the first and second pole piece layers at their back gap portions; and making a read head as follows:

forming a ferromagnetic pinned layer structure which has a magnetic moment;

forming an antiferromagnetic pinning layer exchange coupled to the pinned layer structure for pinning the magnetic moment of the pinned layer in a predetermined direction;

forming a ferromagnetic free layer structure;

forming a nonmagnetic conductive spacer layer between the free and pinned layers;

forming ferromagnetic first and second shield layers with the pinned layer structure, the pinning layer, the spacer layer and the free layer structure located between the first and second shield layers;

each of the pinned layer structure, the pinning layer, the spacer layer, the free layer structure and the first and second shield layers being formed with top and bottom film surfaces bounded by front and back edges and first and second side edges wherein the front edges are located at or closer to the ABS than the back edges;

forming first and second insulation layers between the first and second shield layers;

forming a first lead layer between the first and second insulation layers with top and bottom film surfaces bounded in part by a front edge and first and second side edges and with the front edge of the first lead layer directly connected to the back edge of the free layer structure;

one of the shield layers being a second lead layer and being formed with one of its first and second film surfaces electrically connected to one of the first and second film surfaces of the pinning layer;

the pinned layer structure being formed as an antiparallel pinned layer structure comprising the steps of:

forming ferromagnetic first and second AP pinned films wherein each AP pinned film has a magnetic moment; and forming an AP coupling film between the first and second AP pinned films which permits the magnetic moments of the AP pinned films to be antiparallel; and the pinned layer structure and the spacer layer being formed so that a net demagnetizing field from the pinned layer structure on the free layer structure is counterbalanced by a ferromagnetic coupling field from the pinned layer structure on the free layer structure.

33. A method of making a magnetic head assembly comprising the steps of:

making a write head as follows:

forming ferromagnetic first and second pole piece layers that have a yoke portion located between a pole tip portion and a back gap portion;

forming a nonmagnetic write gap layer between the pole tip portions of the first and second pole piece layers;

forming an insulation stack with at least one coil layer embedded therein between the yoke portions of the first and second pole piece layers; and connecting the first and second pole piece layers at their back gap portions; and making a read head as follows:

forming a ferromagnetic pinned layer structure which has a magnetic moment;

forming an antiferromagnetic pinning layer exchange coupled to the pinned layer structure for pinning the magnetic moment of the pinned layer in a predetermined direction;

forming a ferromagnetic free layer structure;

forming a nonmagnetic conductive spacer layer between the free and pinned layers;

forming ferromagnetic first and second shield layers with the pinned layer structure, the pinning layer, the spacer layer and the free layer structure located between the first and second shield layers;

each of the pinned layer structure, the pinning layer, the spacer layer, the free layer structure and the first and second shield layers being formed with top and bottom film surfaces bounded by front and back edges and first and second side edges wherein the front edges are located at or closer to the ABS than the back edges;

forming first and second insulation layers between the first and second shield layers;

forming a first lead layer between the first and second insulation layers with top and bottom film surfaces bounded in part by a front edge and first and second side edges and with the front edge of the first lead layer directly connected to the back edge of the free layer structure;

one of the shield layers being a second lead layer and being formed with one of its first and second film surfaces electrically connected to one of the first and second film surfaces of the pinning layer;

each of the first lead layer and the free layer structure being formed closer to the first shield layer than the second shield layer so that the first and second shield layers exert a net image current field on the free layer structure that is oriented parallel to the ABS and parallel to the first and second film surfaces of the free layer structure for stabilizing magnetic domains of the free layer structure;

the pinned layer structure being formed as an antiparallel pinned layer structure comprising the steps of:
    forming ferromagnetic first and second AP pinned films wherein each AP pinned film has a magnetic moment; and
    forming an AP coupling film between the first and second AP pinned films which permits the magnetic moments of the AP pinned films to be antiparallel; and the pinned layer structure and the spacer layer being formed so that a net demagnetizing field from the pinned layer structure on the free layer structure is counterbalanced by a ferromagnetic coupling field from the pinned layer structure on the free layer structure.

34. A magnetic read head, which has a head surface for facing a moving magnetic medium, comprising:

a ferromagnetic pinned layer structure having a magnetic moment;

an antiferromagnetic pinning layer exchange coupled to the pinned layer structure for pinning the magnetic moment of the pinned layer in a predetermined direction;

a ferromagnetic free layer structure;

a nonmagnetic conductive spacer layer located between the free and pinned layers;

ferromagnetic first and second shield layers;

the pinned layer structure, the pinning layer, the spacer layer and the free layer structure being located between the first and second shield layers;

each of the pinned layer structure, the pinning layer, the spacer layer, the free layer structure and the first and second shield layers having top and bottom film surfaces completely bounded by front and back edge surfaces and first and second side edge surfaces wherein the front and back edge surfaces are parallel to the head surface with the front edge surface being located at or closer to the head surface than the back edge surface;

first and second insulation layers located between the first and second shield layers;

a first lead layer located between the first and second insulation layers and having top and bottom film surfaces bounded in part by a front edge surface and first and second side edge surfaces wherein the front edge surface of the first lead layer is parallel to the head surface;

the front edge surface of the first lead layer being directly connected to the back edge surface of the free layer structure for electrical connection thereto; and one of the first and second shield layers being a second lead layer and having one of its first and second film surfaces electrically connected to one of the first and second film surfaces of the pinning layer.

35. A magnetic read head as claimed in claim 34 including:

each of the first lead layer and the free layer structure being closer to the first shield layer than the second shield layer so that the first and second shield layers exert a net image current field on the free layer structure that is oriented parallel to the head surface and parallel to the first and second film surfaces of the free layer structure for stabilizing magnetic domains of the free layer structure.

36. A magnetic read head as claimed in claim 35 wherein the pinned layer structure is an antiparallel pinned layer structure which includes:

ferromagnetic first and second AP pinned films wherein each AP pinned film has a magnetic moment; and an AP coupling film between the first and second AP pinned films which permits the magnetic moments of the AP pinned films to be antiparallel.

37. A magnetic read head as claimed in claim 36 wherein a net demagnetizing field from the pinned layer structure on the free layer structure is counterbalanced by a ferromagnetic coupling field from the pinned layer structure on the free layer structure.

38. A magnetic head assembly, which has a head surface for facing a moving magnetic medium, comprising:

a write head including:
    ferromagnetic first and second pole piece layers that have a yoke portion located between a pole tip portion and a back gap portion;
    a nonmagnetic write gap layer located between the pole tip portions of the first and second pole piece layers;
    an insulation stack with at least one coil layer embedded therein located between the yoke portions of the first and second pole piece layers; and
    the first and second pole piece layers being connected at their back gap portions; and a read head including:
    a ferromagnetic pinned layer structure having a magnetic moment;
    an antiferromagnetic pinning layer exchange coupled to the pinned layer structure for pinning the magnetic moment of the pinned layer in a predetermined direction;
    a ferromagnetic free layer structure,
    a nonmagnetic conductive spacer layer located between the free and pinned layers;
    ferromagnetic first and second shield layers;
    the pinned layer structure, the pinning layer, the spacer layer and the free layer structure being located between the first and second shield layers;
    each of the pinned layer structure, the pinning layer, the spacer layer, the free layer structure and the first and second shield layers having top and bottom film surfaces completely bounded by front and back edge surfaces and first and second side edge surfaces wherein the front and back edge surfaces are parallel to the head surface with the front edge surface being located at or closer to the head surface than the back edge surface;

first and second insulation layers located between the first and second shield layers;

a first lead layer located between the first and second insulation layers and having top and bottom film surfaces bounded in part by a front edge surface and first and second side edge surfaces wherein the front edge surface of the first lead layer is parallel to the head surface;

the front edge surface of the first lead layer being directly connected to the back edge surface of the free layer structure for electrical connection thereto; and one of the first and second shield layers being a second lead layer and having one of its first and second film surfaces electrically connected to one of the first and second film surfaces of the pinning layer.

39. A magnetic head assembly as claimed in claim 38 including:

each of the first lead layer and the free layer structure being closer to the first shield layer than the second shield layer so that the first and second shield layers exert a net image current field on the free layer structure that oriented parallel to the head surface and the first and second film surfaces of the free layer structure for stabilizing magnetic domains of the free layer structure.

40. A magnetic head assembly as claimed in claim 39 wherein the pinned layer structure is an antiparallel pinned layer structure which includes:

ferromagnetic first and second AP pinned films wherein each AP pinned film has a magnetic moment; and an AP coupling film between the first and second AP pinned films which permits the magnetic moments of the AP pinned films to be antiparallel.

41. A magnetic head assembly as claimed in claim 40 wherein a net demagnetizing field from the pinned layer structure on the free layer structure is counterbalanced by a ferromagnetic coupling field from the pinned layer structure on the free layer structure.

42. A method of making a magnetic read head, which has a head surface for facing a moving magnetic medium, comprising the steps of:

forming a ferromagnetic pinned layer structure which has a magnetic moment;

forming an antiferromagnetic pinning layer exchange coupled to the pinned layer structure for pinning the magnetic moment of the pinned layer in a predetermined direction;

forming a ferromagnetic free layer structure;

forming a nonmagnetic conductive spacer layer between the free and pinned layers;

forming ferromagnetic first and second shield layers with the pinned layer structure, the pinning layer, the spacer layer and the free layer structure located between the first and second shield layers;

each of the pinned layer structure, the pinning layer, the spacer layer, the free layer structure and the first and second shield layers being formed with top and bottom film surfaces completely bounded by front and back edge surfaces and first and second side edge surfaces wherein the front and back edge surfaces are parallel to the head surface with the front edge surface being located at or closer to the head surface than the back edge surface;

forming first and second insulation layers between the first and second shield layers;

forming a first lead layer located between the first and second insulation layers with top and bottom film surfaces bounded in part by a front edge surface and first and second side edge surfaces wherein the front edge surface of the first lead layer is parallel to the head surface; and wherein the front edge surface of the first lead layer is directly connected to the back edge surface of the free layer structure for electrical connection thereto and one of the shield layers being a second lead layer and being formed with one of its first and second film surfaces electrically connected to one of the first and second film surfaces of the pinning layer.

43. A method of making a magnetic read head as claimed in claim 42 including:

each of the first lead layer and the free layer structure being formed closer to the first shield layer than the second shield layer so that the first and second shield layers exert a net image current field on the free layer structure that is oriented parallel to the head surface and parallel to the first and second film surfaces of the free layer structure for stabilizing magnetic domains of the free layer structure.

44. A method of making a magnetic read head as claimed in claim 43 wherein the pinned layer structure is formed as an antiparallel pinned layer structure comprising the steps of:

forming ferromagnetic first and second AP pinned films wherein each AP pinned film has a magnetic moment; and forming an AP coupling film between the first and second AP pinned films which permits the magnetic moments of the AP pinned films to be antiparallel.

45. A method of making a magnetic read head as claimed in claim 44 wherein the pinned layer structure and the spacer layer are formed so that a net demagnetizing field from the pinned layer structure on the free layer structure is counterbalanced by a ferromagnetic coupling field from the pinned layer structure on the free layer structure.

46. A magnetic read head, which has a head surface for facing a moving magnetic medium, comprising:

a ferromagnetic pinned layer structure having a magnetic moment;

an antiferromagnetic pinning layer exchange coupled to the pinned layer structure for pinning the magnetic moment of the pinned layer in a predetermined direction;

a ferromagnetic free layer structure;

a nonmagnetic conductive spacer layer located between the free and pinned layers;

ferromagnetic first and second shield layers;

the pinned layer structure, the pinning layer, the spacer layer and the free layer structure being located between the first and second shield layers;

each of the pinned layer structure, the pinning layer, the spacer layer, the free layer structure and the first and second shield layers having top and bottom film surfaces bounded by front and back edges and first and second side edges wherein the front edges are located at or closer to the head surface than the back edges;

first and second insulation layers located between the first and second shield layers;

a first lead layer means located between the first and second insulation layers and having top and bottom film surfaces bounded in part by a front edge and first and second side edges;

one of the first and second shield layers being a second lead layer means and having one of its first and second film surfaces electrically connected to one of the first and second film surfaces of the pinning layer; and the front edge of the first lead layer means being electrically connected to the back edge of the free layer structure for conducting a current through the free layer structure perpendicular to the head surface and through the spacer, pinned and pinning layers parallel to the head surface to said second lead layer means.

47. A magnetic read head as claimed in claim 46 including:

each of the first lead layer and the free layer structure being closer to the first shield layer than the second shield layer so that the first and second shield layers exert a net image current field on the free layer structure that is oriented parallel to the head surface and parallel to the first and second film surfaces of the free layer structure for stabilizing magnetic domains of the free layer structure.

48. A magnetic read head as claimed in claim 47 wherein the pinned layer structure is an antiparallel pinned layer structure which includes:

ferromagnetic first and second AP pinned films wherein each AP pinned film has a magnetic moment; and an AP coupling film between the first and second AP pinned films which permits the magnetic moments of the AP pinned films to be antiparallel.

49. A magnetic read head, which has a head surface for facing a moving magnetic medium, comprising:

a ferromagnetic pinned layer structure having a magnetic moment;

an antiferromagnetic pinning layer exchange coupled to the pinned layer structure for pinning the magnetic moment of the pinned layer in a predetermined direction;

a ferromagnetic free layer structure;

a nonmagnetic conductive spacer layer located between the free and pinned layers;

ferromagnetic first and second shield layers;

the pinned layer structure, the pinning layer, the spacer layer and the free layer structure being located between the first and second shield layers;

each of the pinned layer structure, the pinning layer, the spacer layer, the free layer structure and the first and second shield layers having top and bottom film surfaces bounded by front and back edges and first and second side edges wherein the front edges are located at or closer to the head surface than the back edges;

first and second insulation layers located between the first and second shield layers;

a first lead layer means located between the first and second insulation layers and having top and bottom film surfaces bounded in part by a front edge and first and second side edges;

one of the first and second shield layers being a second lead layer means and having one of its first and second film surfaces electrically connected to one of the first and second film surfaces of the pinning layer;

the front edge of the first lead layer means being electrically connected to the back edge of the free layer structure for conducting a current through the free layer structure perpendicular to the head surface and through the spacer, pinned and pinning layers parallel to the head surface to said second lead layer means;

each of the first lead layer and the free layer structure being closer to the first shield layer than the second shield layer so that the first and second shield layers exert a net image current field on the free layer structure that is oriented parallel to the head surface and parallel to the first and second film surfaces of the free layer structure for stabilizing magnetic domains of the free layer structure;

the pinned layer structure being an antiparallel pinned layer structure which includes:

ferromagnetic first and second AP pinned films wherein each AP pinned film has a magnetic moment; and an AP coupling film between the first and second AP pinned films which permits the magnetic moments of the AP pinned films to be antiparallel; and a net demagnetizing field from the pinned layer structure on the free layer structure being counterbalanced by a ferromagnetic coupling field from the pinned layer structure on the free layer structure.

50. A magnetic head assembly, which has a head surface for facing a moving magnetic medium, comprising:

a write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; and a read head including:

a ferromagnetic pinned layer structure having a magnetic moment;

an antiferromagnetic pinning layer exchange coupled to the pinned layer structure for pinning the magnetic moment of the pinned layer in a predetermined direction;

a ferromagnetic free layer structure;

a nonmagnetic conductive spacer layer located between the free and pinned layers;

ferromagnetic first and second shield layers;

the pinned layer structure, the pinning layer, the spacer layer and the free layer structure being located between the first and second shield layers;

each of the pinned layer structure, the pinning layer, the spacer layer, the free layer structure and the first and second shield layers having top and bottom film surfaces bounded by front and back edges and first and second side edges wherein the front edges are located at or closer to the head surface than the back edges;

first and second insulation layers located between the first and second shield layers;

a first lead layer means located between the first and second insulation layers and having top and bottom film surfaces bounded in part by a front edge and first and second side edges;

one of the first and second shield layers being a second lead layer means and having one of its first and second film surfaces electrically connected to one of the first and second film surfaces of the pinning layer; and the front edge of the first lead layer means being electrically connected to the back edge of the free layer structure for conducting a current through the free layer structure perpendicular to the head surface and through the spacer, pinned and pinning layers parallel to the head surface to said second lead layer means.

51. A magnetic head assembly as claimed in claim 50 including:

each of the first lead layer and the free layer structure being closer to the first shield layer than the second shield layer so that the first and second shield layers exert a net image current field on the free layer structure that is oriented parallel to the head surface and parallel to the first and second film surfaces of the free layer structure for stabilizing magnetic domains of the free layer structure.

52. A magnetic head assembly as claimed in claim 51 wherein the pinned layer structure is an antiparallel pinned layer structure which includes:

ferromagnetic first and second AP pinned films wherein each AP pinned film has a magnetic moment; and an AP coupling film between the first and second AP pinned films which permits the magnetic moments of the AP pinned films to be antiparallel.

53. A magnetic head assembly, which has a head surface for facing a moving magnetic medium, comprising:

a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and a read head including:
a ferromagnetic pinned layer structure having a magnetic moment;
an antiferromagnetic pinning layer exchange coupled to the pinned layer structure for pinning the magnetic moment of the pinned layer in a predetermined direction;
a ferromagnetic free layer structure;
a nonmagnetic conductive spacer layer located between the free and pinned layers;
ferromagnetic first and second shield layers;
the pinned layer structure, the pinning layer, the spacer layer and the free layer structure being located between the first and second shield layers;
each of the pinned layer structure, the pinning layer, the spacer layer, the free layer structure and the first and second shield layers having top and bottom film surfaces bounded by front and back edges and first and second side edges wherein the front edges are located at or closer to the head surface than the back edges;
first and second insulation layers located between the first and second shield layers;
a first lead layer means located between the first and second insulation layers and having top and bottom film surfaces bounded in part by a front edge and first and second side edges;
one of the first and second shield layers being a second lead layer means and having one of its first and second film surfaces electrically connected to one of the first and second film surfaces of the pinning layer;
the front edge of the first lead layer means being electrically connected to the back edge of the free layer structure for conducting a current through the free layer structure perpendicular to the head surface and through the spacer, pinned and pinning layers parallel to the head surface to said second lead layer means;
each of the first lead layer and the free layer structure being closer to the first shield layer than the second shield layer so that the first and second shield layers exert a net image current field on the free layer structure that is oriented parallel to the head surface and parallel to the first and second film surfaces of the free layer structure for stabilizing magnetic domains of the free layer structure;
the pinned layer structure being an antiparallel pinned layer structure which includes:
ferromagnetic first and second AP pinned films wherein each AP pinned film has a magnetic moment; and
an AP coupling film between the first and second AP pinned films which permits the magnetic moments of the AP pinned films to be antiparallel; and
a net demagnetizing field from the pinned layer structure on the free layer structure being counterbalanced by a ferromagnetic coupling field from the pinned layer structure on the free layer structure.

54. A method of making a magnetic read head, which has a head surface for facing a moving magnetic medium, comprising the steps of:

forming a ferromagnetic pinned layer structure which has a magnetic moment;

forming an antiferromagnetic pinning layer exchange coupled to the pinned layer structure for pinning the magnetic moment of the pinned layer in a predetermined direction;

forming a ferromagnetic free layer structure;

forming a nonmagnetic conductive spacer layer between the free and pinned layers;

forming ferromagnetic first and second shield layers with the pinned layer structure, the pinning layer, the spacer layer and the free layer structure located between the first and second shield layers;

each of the pinned layer structure, the pinning layer, the spacer layer, the free layer structure and the first and second shield layers being formed with top and bottom film surfaces bounded by front and back edges and first and second side edges wherein the front edges are located at or closer to the head surface than the back edges;

forming first and second insulation layers between the first and second shield layers;

forming a first lead layer means between the first and second insulation layers with top and bottom film surfaces bounded in part by a front edge and first and second side edges;

one of the shield layers being a second lead layer means and being formed with one of its first and second film surfaces electrically connected to one of the first and second film surfaces of the pinning layer; and forming the front edge of the first lead layer means by electrically connecting it to the back edge of the free layer structure for conducting a current through the free layer structure perpendicular to the head surface and through the spacer, pinned and pinning layers parallel to the head surface to said second lead layer means.

55. A method of making a magnetic read head as claimed in claim 54 including:

each of the first lead layer and the free layer structure being formed closer to the first shield layer than the second shield layer so that the first and second shield layers exert a net image current field on the free layer structure that is oriented parallel to the head surface and parallel to the first and second film surfaces of the free layer structure for stabilizing magnetic domains of the free layer structure.

56. A method of making a magnetic read head as claimed in claim 55 wherein the pinned layer structure is formed as an antiparallel pinned layer structure comprising the steps of:

forming ferromagnetic first and second AP pinned films wherein each AP pinned film has a magnetic moment; and forming an AP coupling film between the first and second AP pinned films which permits the magnetic moments of the AP pinned films to be antiparallel.

57. A method of making a magnetic read head, which has a head surface for facing a moving magnetic medium, comprising the steps of:

forming a ferromagnetic pinned layer structure which has a magnetic moment;

forming an antiferromagnetic pinning layer exchange coupled to the pinned layer structure for pinning the magnetic moment of the pinned layer in a predetermined direction;

forming a ferromagnetic free layer structure;

forming a nonmagnetic conductive spacer layer between the free and pinned layers;

forming ferromagnetic first and second shield layers with the pinned layer structure, the pinning layer, the spacer layer and the free layer structure located between the first and second shield layers;

each of the pinned layer structure, the pinning layer, the spacer layer, the free layer structure and the first and second shield layers being formed with top and bottom film surfaces bounded by front and back edges and first and second side edges wherein the front edges are located at or closer to the head surface than the back edges;

forming first and second insulation layers between the first and second shield layers;

forming a first lead layer means between the first and second insulation layers with top and bottom film surfaces bounded in part by a front edge and first and second side edges;

one of the shield layers being a second lead layer means and being formed with one of its first and second film surfaces electrically connected to one of the first and second film surfaces of the pinning layer;

forming the front edge of the first lead layer means by electrically connecting it to the back edge of the free layer structure for conducting a current through the free layer structure perpendicular to the head surface and through the spacer, pinned and pinning layers parallel to the head surface to said second lead layer means;

each of the first lead layer and the free layer structure being formed closer to the first shield layer than the second shield layer so that the first and second shield layers exert a net image current field on the free layer structure that is oriented parallel to the head surface and parallel to the first and second film surfaces of the free layer structure for stabilizing magnetic domains of the free layer structure;

the pinned layer structure being formed as an antiparallel pinned layer structure comprising the steps of:

forming ferromagnetic first and second AP pinned films wherein each AP pinned film has a magnetic moment; and forming an AP coupling film between the first and second AP pinned films which permits the magnetic moments of the AP pinned films to be antiparallel; and the pinned layer structure and the spacer layer being formed so that a net demagnetizing field from the pinned layer structure on the free layer structure is counterbalanced by a ferromagnetic coupling field from the pinned layer structure on the free layer structure.

* * * * *